April 20, 1965 W. C. FELTS ETAL 3,179,404

DOCUMENT TRANSPORTING APPARATUS

Filed Aug. 16, 1963

4 Sheets-Sheet 1

INVENTORS
WILLIAM C. FELTS
STANLEY A. MANNING

BY Edward G. Fiorito

ATTORNEY

April 20, 1965 W. C. FELTS ETAL 3,179,404

DOCUMENT TRANSPORTING APPARATUS

Filed Aug. 16, 1963 4 Sheets-Sheet 2

April 20, 1965 W. C. FELTS ETAL 3,179,404

DOCUMENT TRANSPORTING APPARATUS

Filed Aug. 16, 1963

4 Sheets-Sheet 4

United States Patent Office 3,179,404
Patented Apr. 20, 1965

3,179,404

DOCUMENT TRANSPORTING APPARATUS

William C. Felts, Peekskill, and Stanley A. Manning, Yorktown Heights, N.Y., assignors to International Business Machines Corporation, New York, N.Y., a corporation of New York Filed Aug. 16, 1963, Ser. No. 302,608
9 Claims. (Cl. 271—57)

This invention relates to a document transporting apparatus, and more particularly to such apparatus wherein the document is stopped and registered a number of times during transport.

Document transporting devices are frequently called upon to rapidly accelerate and decelerate documents with a high degree of accuracy in alignment at each stopping point. For example character recognition systems require that the document be moved rapidly from a feed station to a reading station. At the read station the document must be aligned with the character reader so that the document may be scanned. Where the document is too large for the scanner, the document must be indexed so that a different portion is presented to the reader for scanning. When the document is moved from the original position to the indexed position, the alignment must be maintained with a high degree of accuracy since any skew or misalignment created during the indexing of the document may cause improper operation of the scanner, or require readjustment thereof.

In addition to the problem of alignment described above, the rapid speeds required cause high accelerations and decelerations of relatively large masses. For example where the document is transported on a carriage connected to a belt and pulley system, the entire mass of the carriage belt and pulley system must be accelerated and decelerated each time the document is started and stopped. The time taken for this acceleration and deceleration is especially critical during the indexing of the document at the reading station of a character recognition system. Since the character reader must stop and wait for the document to be indexed to the next position, valuable operating time of the character reader is lost.

It is an object of the present invention to provide an improved document transporting apparatus capable of rapidly moving a document from one point to another.

It is another object of the present invention to provide an improved document transporting apparatus capable of rapidly moving a document from one point to another with a high degree of positional accuracy at each point.

Still another object of the present invention is to provide an improved document transporting apparatus capable of delivering a document to a reading station and indexing the document a number of times so that different portions of the document are exposed at the reading station, such indexing being accomplished with high speed and positional accuracy.

These and other objects of the present invention are accomplished in accordance with the broad aspect of the present invention by separating the mass of the document from most of the mass of the transporting appapaaratus continues to decelerate stretching the expandable holds the leading edge of the document. The gripper is attached to the rest of the transporting apparatus by means of an expandable coupling. When the gripper is stopped at a station the remainder of the transporting apparatus continues to decelerate stretching the expandable coupling. The gripper may be indexed a number of times at the station by releasing the gripper and allowing the expandable coupling to contract pulling the gripper up to the next stopping point.

An advantage is obtained since the document may be indexed by merely releasing the gripper and allowing the expandable coupling to contract pulling the document and gripper up to the next stopping point. The entire transporting apparatus need not be accelerated and decelerated during this indexing. Therefore the indexing may be accomplished with greater speed.

An advantageous feature of the present invention is utilized when the document is initially stopped at a station. Only the mass of the gripper need be abruptly halted while the mass of the remainder of the transporting apparatus can continue to decelerate at a lower rate. The slow deceleration of the remainder of the transporting apparatus serves a dual function. First the large mass of most of the transporting apparatus is allowed to decelerate at a lower rate, and second the expandable coupling is stretched so that energy is stored within the coupling in readiness for the indexing of the gripper and document.

The foregoing and other objects, features and advantages of the invention will be apparent from the following more particular description of a preferred embodiment of the invention, as illustrated in the accompanying drawings.

Figure 1:
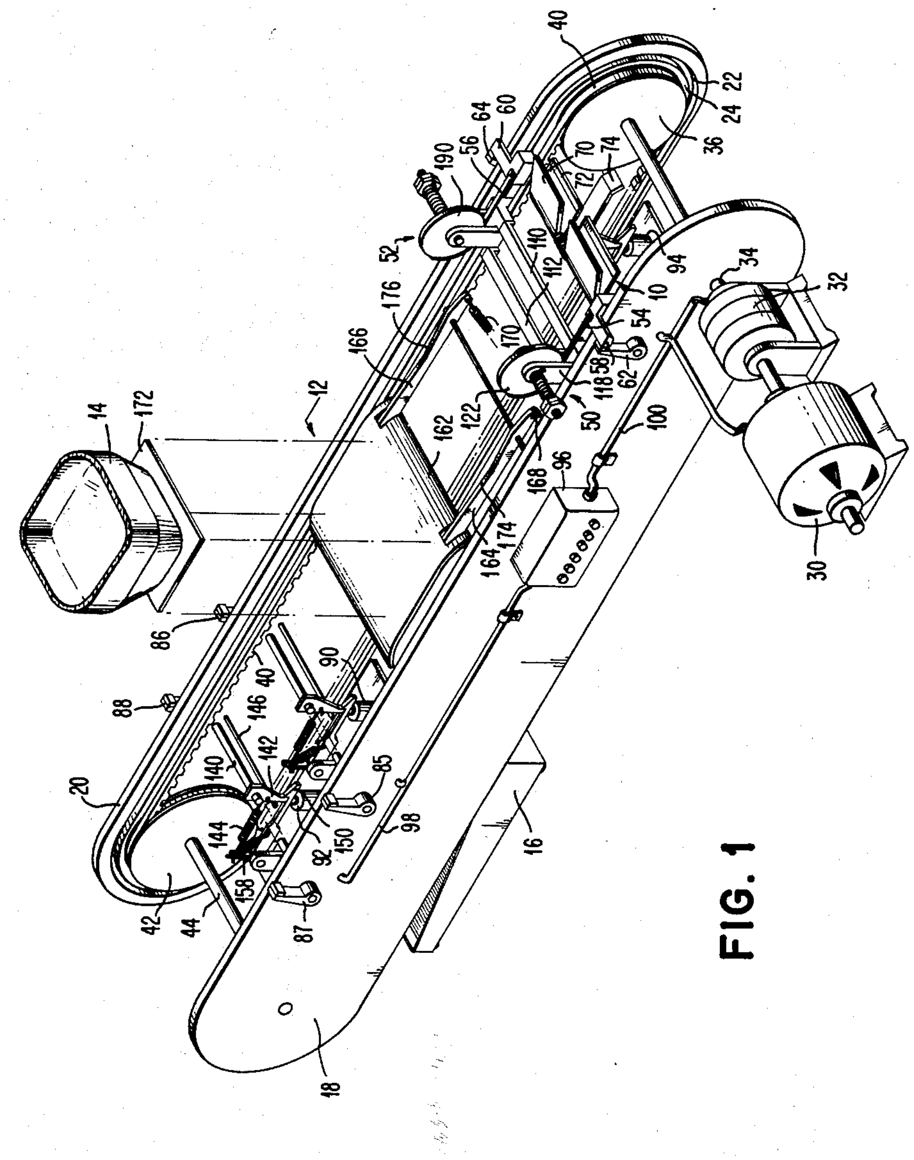
FIG. 1 is an isometric drawing illustrating a document transporting apparatus embodying the present invention.

The general operation of the document transporting apparatus is shown in FIG. 1. The document to be transported is inserted into a gripper 10. The gripper 10 is pulled over to a reading station 12, where it is scanned by a character recognition system including a scanning tube 14, a portion of which is illustrated in FIG. 1.

After the scanning is completed at the reading station 12, the gripper 10 and document are moved around to the bottom of the document transporting apparatus where the document is deposited in a tray 16. The document gripper continues to travel around to the top of the document transporting apparatus where it returns to the initial position to receive another document.

The main structural support for the document transporting apparatus is provided by side plates 18 and 20. Each of the side plates 18 and 20 has a track cut therein illustrated by the track 22 cut into an inner face 24 of side plate 20. Side plate 18 also has a matching track 26 better illustrated in FIG. 2. The gripper 10 rides in the tracks 22 and 26.

Power is supplied by a motor 30 coupled to a clutch 32. The clutch delivers power to a shaft 34 upon which is mounted a drive wheel 36 shown in FIG. 1 and another drive wheel not shown. A timing belt 40 is wrapped around the drive wheel 36 and also about an idle wheel 42 rotationally mounted upon a shaft 44. Also mounted upon the shaft 44 is another idle wheel, not shown, which is encircled by a timing belt 46 shown in FIG. 4. The timing belt 46 also encircles drive wheel mounted on shaft 34 adjacent side plate 18. When the motor 30 turns and clutch 32 couples power to the shaft 34 the timing belts 40 and 46 are caused to rotate in a counterclockwise direction as appearing in FIG. 1.

Also shown in FIG. 1 are two drive assemblies 50 and 52. The drive assemblies 50 and 52 are mounted upon the timing belts 46 and 40 respectively and ride in the tracks 22 and 26 when the clutch 32 couples power to the shaft 34. The gripper 10 is coupled to the drive assemblies 50 and 52 by straps 54 and 56 respectively. The straps 54 and 56 can be lengthened in a manner to be described in detail in connection with FIG. 2 below.

The gripper 10 is provided with a pair of arms 58 and 60 which engage a pair of stops 62 and 64. The stops 62 and 64 do not engage any part of the driver assemblies 50 and 52 which are allowed to pass by the stops 62 and 64. Therefore when the stops 62 and 64 halt the gripper 10 and the drivers 50 and 52 continue their motion, the straps 54 and 56 are extended until the clutch 32 uncouples the motor 30 from the shaft 34. The clutch 32 performs as a one-way clutch preventing the timing belts from reversing their motion and moving in a clockwise direction in response to an attempt by the drivers 50 and 52 to contract the straps 54 and 56.

The gripper 10 has a pair of jaws 70 and 72 which are open in the position shown in FIG. 1. The jaws 70 and 72 are cammed open by a camming surface 74 which is secured to the side plates 18 and 20 by mounts, not shown. After the paper is inserted and the gripper 10 leaves the camming surface 74 the jaws are biased in the closed position by a torsion spring 76 better illustrated in FIG. 2. The jaws 70 and 72 remain closed until the document arrives at the tray 16 below the document transporting device. At this time the jaws are cammed open by a camming surface 78 shown in FIG. 3. The camming surface 78 is engaged by follower arm 80 which cranks open the jaws 70 and 72 releasing a document 82 shown in FIG. 3 in phantom line.

As illustrated in FIG. 1 the gripper 10 may be halted by two more pairs of stops 85, 86, 87 and 88. Stops 85 and 86 are released by activating a coil 90, and stops 87 and 88 are released by activating a coil 92. Stops 62 and 64 are released by another coil 94. Coils 90, 92 and 94 are controlled by signals from a control box 96 via cables 98 and 100. The motor 30 and clutch 32 are also controlled by signals from control box 96 via cable 100. The control box 96 is shown to be manually operated in the illustrative embodiment. However the control box may be operated in response to signals from the character recognition system associated with scanner tube 14 if automatic operation is preferred.

Figure 2:
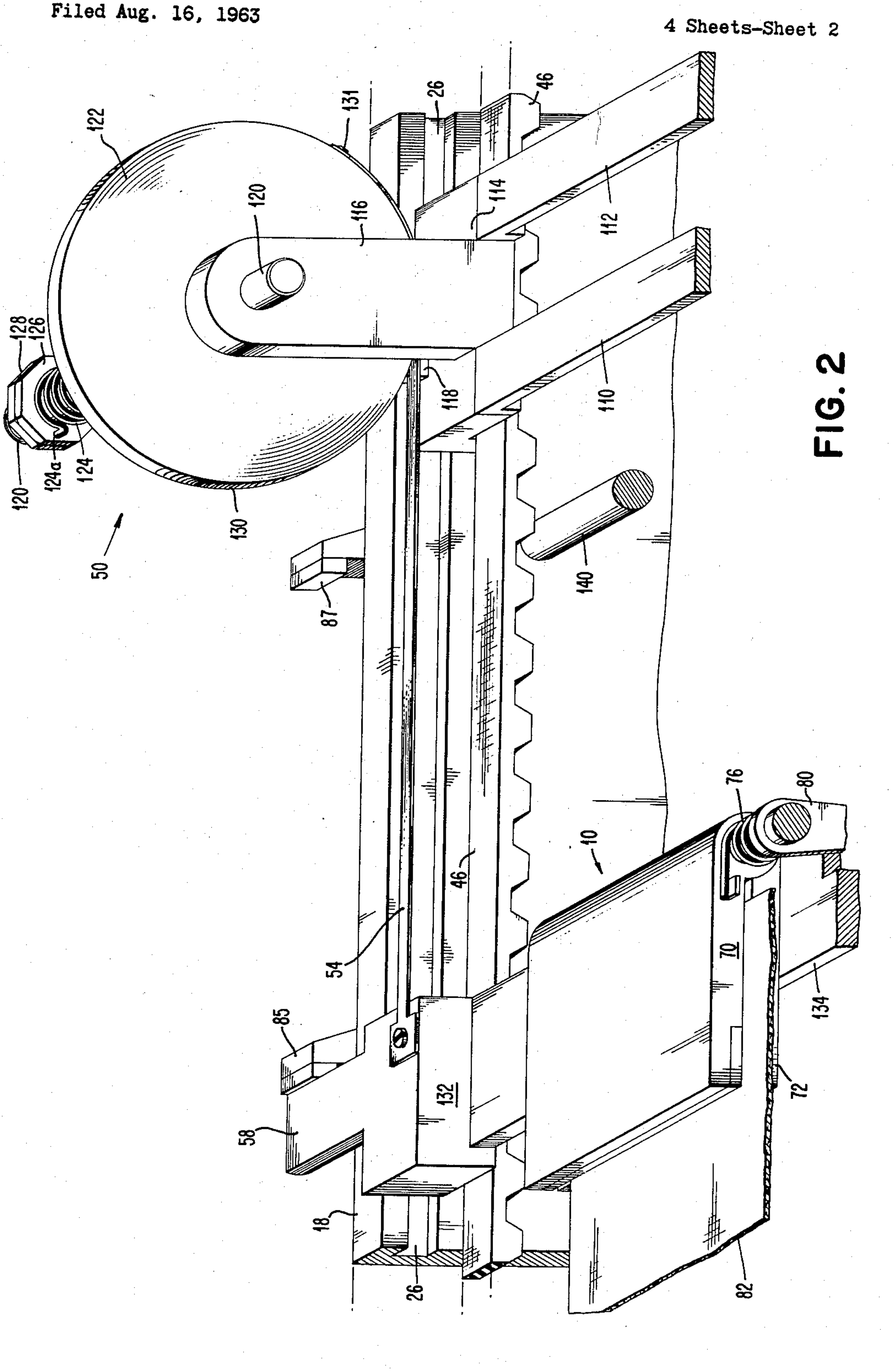
FIG. 2 is a cabinet drawing illustrating a document gripper and expandable coupling shown in FIG. 1.
Figure 4:
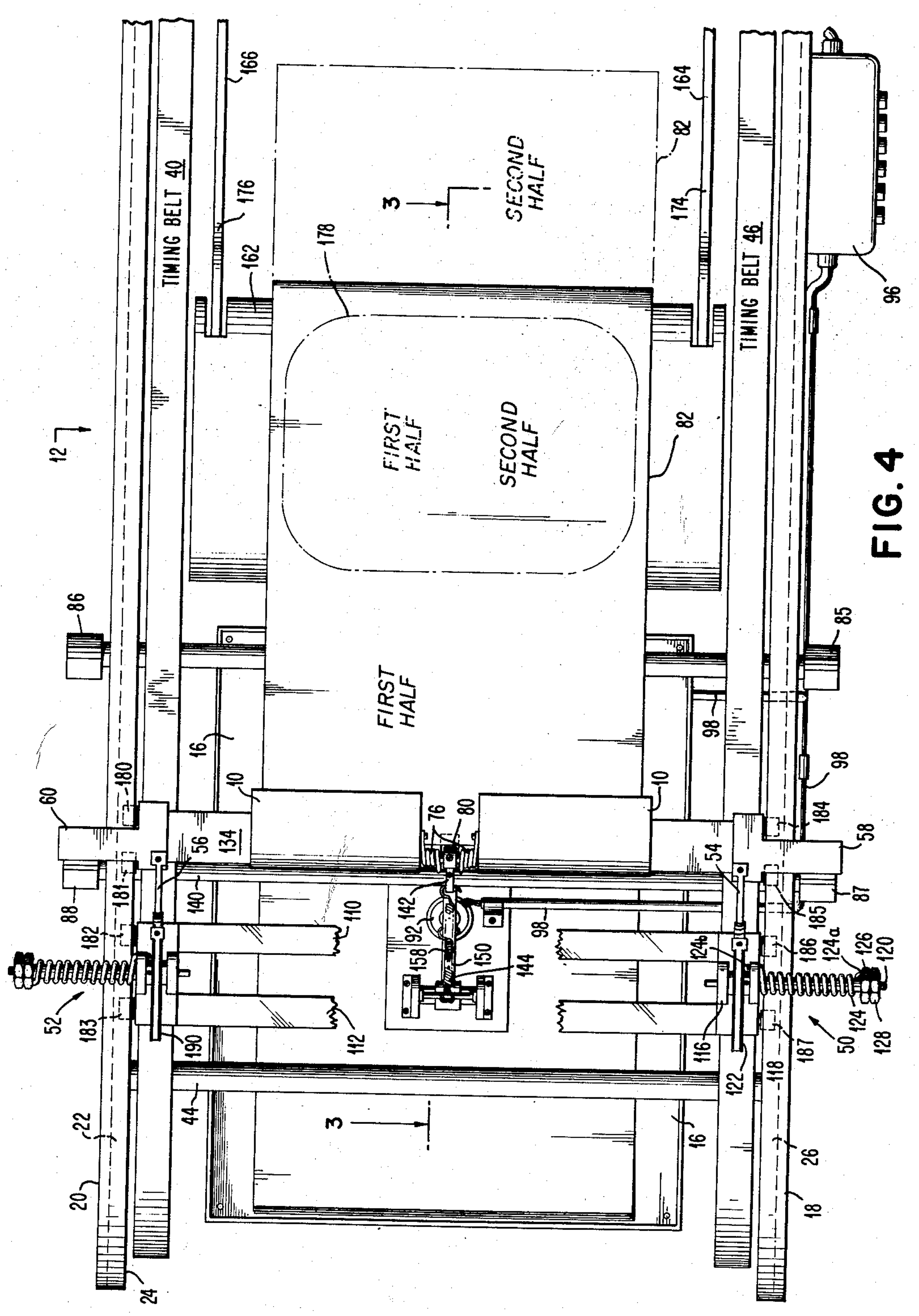
FIG. 4 is a top view of the portion of the document transporting apparatus shown in FIG. 3.

FIG. 2 illustrates the details of the driver assembly 50. Two cross bars 110 and 112 extend transversely between the timing belts 46 and 40 connecting the two driver assemblies 50 and 52 together. A housing 114 is fastened to the two cross bars 110 and 112. Also fastened to the housing 114 are two pillow blocks 116 and 118. Pillow block 118 is best shown in FIG. 1 while pillow block 116 is best shown in FIG. 2. A shaft 120 is journaled in the pillow blocks 116 and 118. A disc 122 is fastened to the shaft 120 between pillow blocks 116 and 118. As the disc 122 turns the shaft 120 turns along with it. Shown in FIG. 2 and also in FIG. 4 is a torsion spring 124 wrapped about the shaft 120. Lock nuts 126 and 128 are secured to the end of the shaft 120. An anchor end 124*a* of spring 124 is anchored into lock nut 126. Another anchor end 124*b* of spring 124 is anchored into pillow block 118, shown in FIG. 4.

As illustrated in FIG. 2 when the disc 122 rotates in a clockwise direction the spring 124 is unwound storing torsional energy therein. The strap 54 is seated in a groove 130 in the circumference of disc 122. Screw 131 holds one end of the strap to the circumference of disc 122. As shown in FIG. 2 the strap 54 is in the extended position. The spring 24 tends to turn the disc 124 in the counter-clockwise direction winding the strap 54 in the groove 130.

The other end of the strap 54 is fastened to the housing 132 of gripper 10. The housing 132 supports arm 58 which is shown engaging stop 85. Also fastened to housing 132 is a cross bar 134 on which jaws 70 and 72 are mounted. When the stop 85 is released the spring 124 causes the disc 122 to rotate in a counter-clockwise direction winding the strap 54 in the groove 130. The gripper 10 is pulled up to the stop 87 which engages the arm 58.

Figure 3:
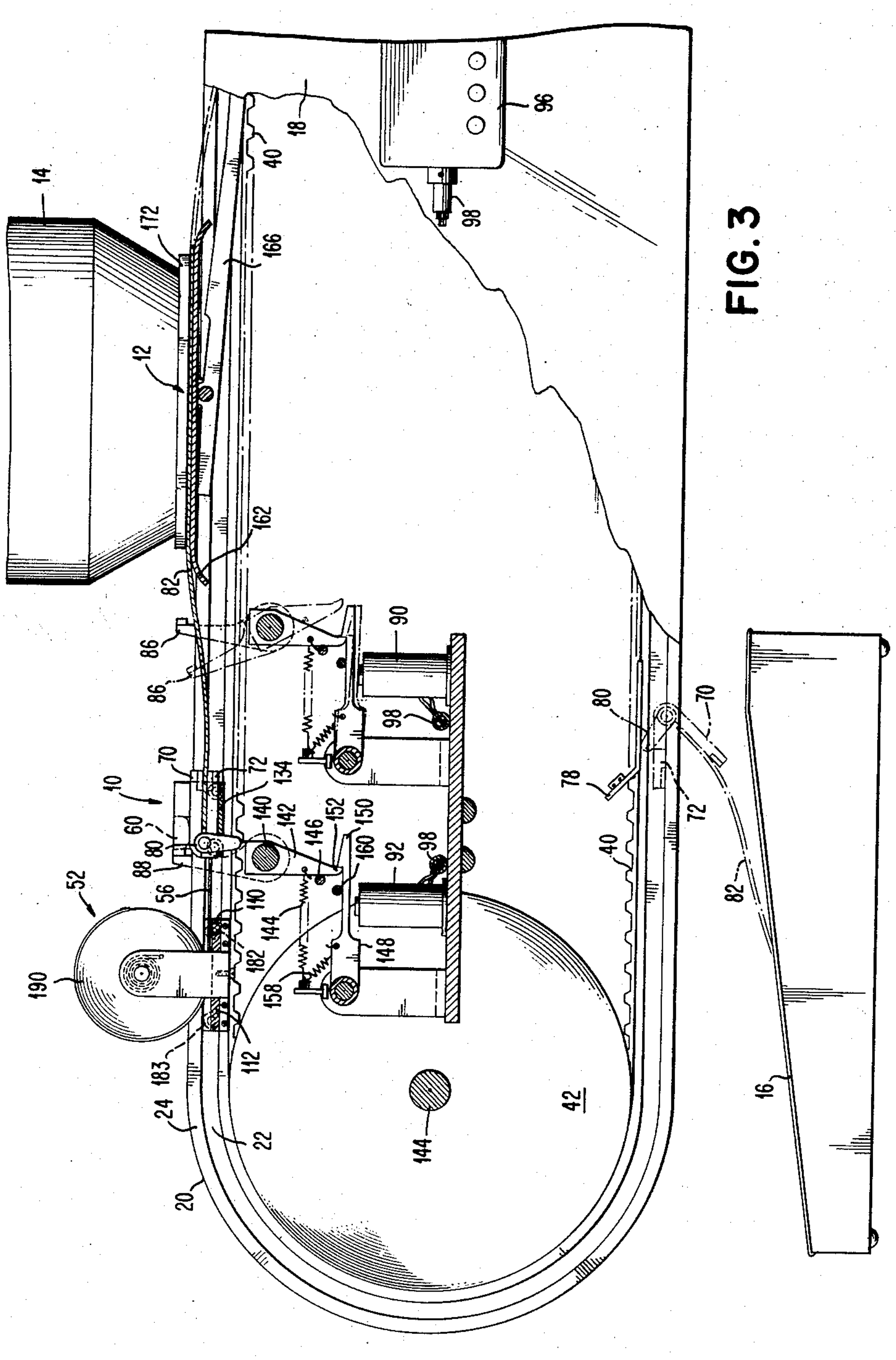
FIG. 3 is a partial side view of the document transporting apparatus shown in FIG. 1.

FIG. 3 illustrates the details of the release mechanism for stops 62, 64 and 85–88. The particular stops shown in FIG. 3 are stops 86 and 88. Stop 88 is shown engaging arm 60. The stop 88 is pivoted upon a shaft 140. Also pivoted on shaft 140 is a pawl 142. The pawl 142 is biased by a spring 144 so that the stop 88 is normally in the upright position. Pin 146 prevents further counter-clockwise movement of pawl 142. A dog armature 148 includes a nose portion 150 which locks the stop 88 in the upright position by engaging a tip 152 of pawl 142.

The stop is released by activating the coil via a signal from cable 98. The coil pulls down dog armature 148 disengaging the nose 150 from the tip 152. When the arm 60 is bearing against the stop 88 the pawl rotates counter-clockwise lowering the stop 88 and permitting the arm 60 to pass by. The released position is illustrated by stop 86 shown in phantom lines.

Returning to the description of the operation of the dog armature 148 in FIG. 3, when the coil 92 is deactivated a spring 158 returns the armature 148 to a position for engaging the pawl 142. In order to prevent the armature 148 from rising too high when the pawl 142 is in the forward released position a stop 160 is provided.

Also shown in FIG. 3 are the details of read station 12. A pressure plate 162 is forced upward by a pair of throw-out arms 166 shown in FIG. 3 and 164 shown in FIG. 1. A pair of springs 168 and 170, shown in FIG. 1, force the pressure plate 162 upward against the document 82 shown in FIG. 3. The document 82 is sandwiched between the pressure plate 162 and a face plate 172 of the scanning tube 14. In operation the throw-out arms 164 and 166 are engaged by the cross-bar 134 of the driver assemblies 50 and 52. The cross-bar 134 cams down the throw-out arms 164 and 166 by riding upon the surfaces 174 and 176. After the drive assemblies 50 and 52 and the gripper 10 pass through the reading station 12, the pressure plate 162 presses the document 82 against the face plate 172. When the gripper 10 is indexed from stop 86 to stop 88 the document 82 slides through the reading station to the position shown in FIG. 3.

FIG. 4 illustrates the two positions that the document 82 can have at the read station 12. The document 82 is divided into two sections, a first half and a second half as indicated in FIG. 4. FIG. 4 shows an image area 178 of the scanning tube 14. In the position shown in FIG. 4, the second half of the document 82 is presented to the image area 178. In this position the gripper 10 is halted by the stops 87 and 88. When the gripper 10 is halted by the stops 85 and 86 the first half of the document 82 is located in the image area 178 as indicated by the phantom lines. Also shown in FIG. 4 are guide wheels 180–187 which guide gripper 10 and driver assemblies 50 and 52 in the tracks 22 and 26.

In summary, what has been shown is a device for rapidly indexing a document at read station 12. In operation referring to FIG. 1, the gripper 10 is halted by stops 62 and 64 so that a document may be inserted in the jaws 70 and 72. The clutch 32 uncouples the motor 30 from shaft 34 allowing the timing belts 40 and 46 along with the associated wheels to decelerate at a slower rate than the abrupt halt of the gripper 10. The drive assemblies 50 and 52 provide an expandable coupling to compensate for the slower deceleration. After the document is inserted in the gripper 10 the stops 62 and 64 are released by a signal from the control box 96. The gripper 10 is drawn toward the drive assemblies 50 and 52 by the retracting straps 54 and 56. Jaws 70 and 72 close gripping the document by the leading edge.

In response to a signal from control box 96 clutch 32 couples power to the shaft 34 and the drive assemblies 50 and 52 move toward the reading station 12. When the cross-bar 112 strikes the surfaces 74 and 76 pressure plate 162 is forced downward where it remains until the gripper 10 passes through the read station 12. When gripper 10 arrives at stops 85 and 86 the forward motion of the document 82 and gripper 10 is halted. The drive assemblies 50 and 52 continue to move past stops 87 and 88 causing the disc 122 of drive assembly 50 and a disc 190 of drive assembly 52 to unwind the straps 54 and 56 respectively. At this time the first half of the document 82, shown in FIG. 4, is presented to the image area 178 of the scanning tube 14. When the stops 85 and 86 are released in response to a signal from control box 96 the straps 54 and 56 wind up upon discs 122 and 190 respectively. The gripper 10 is pulled toward the drive assemblies 50 and 52 until the arms 58 and 60 engage stops 87 and 88. At this time the second half of the document 82 is presented to the image area 178 shown in FIG. 4. Following release of stops 87 and 88 the document 82 is deposited in tray 16 and the gripper 10 continues until it is stopped at the position shown in FIG. 1.

During the indexing of the document 82, the only portions of the document transporting apparatus which move are the gripper 10, straps 54 and 56, and the rotating elements of drive assemblies 50 and 52. The mass of these portions of the document transporting apparatus is relatively small compared to the mass of the timing belts 40 and 46 along with the associated drive and idle wheels, and rotating shafts 34 and 44. When the response time of the clutch 32 is added to the time taken to accelerate and decelerate this latter mass, the total time that would be taken to index the document by moving this latter mass, would be considerably longer than the time taken to index the document by apparatus employing the present invention.

Although only two pairs of stops 85–88 are shown for indexing the document at the read station 12, it may be desirable for certain documents to perform the scanning in more than two stages. Therefore additional pairs of stops could be added. Also additional driver assemblies and grippers could be secured to the drive belts so that a plurality of documents could be handled at the same time. Another modification can be made to the stops 85–88, 62 and 64 by employing only a single centrally located stop at each halting position. In the preferred embodiment a pair of stops were used because better registration of the gripper 10 is accomplished there being no relative skew between the stopping positions of the gripper 10. However for certain applications a single stop may provide sufficient registration for the intended purpose.

Likewise two drive assemblies 50 and 52 were shown in the preferred embodiment in order to achieve accurate registration. However a single centrally located drive assembly may provide sufficient registration for some applications. Further the drive assemblies may be mounted upon the gripper 10 and the extendable ends of the straps 54 and 56 may be secured to the belts 46 and 40 in some applications of the present invention.

Additionally the drive assemblies 50 and 52 are shown to employ straps 54 and 56 wrapped about the circumference of discs 122 and 190 in order to provide an expandable coupling. However other expandable coupling means could be employed to couple the gripper 10 to the remainder of the document transporting apparatus. For example the straps 54 and 56 could be replaced with expansion springs or other yieldable elements that would store energy when stretched for later use when the document is indexed.

While the invention has been particularly shown and described with reference to a preferred embodiment thereof, it will be understood by those skilled in the art that the foregoing and other changes in details may be made therein without departing from the spirit and scope of the invention.

We claim:

1. A document transporting device comprising:

first feed means operable to transport on a document by document basis each document through a station, said first feed means including further second feed means for permitting each said document to be indexed increment by increment at said station under the bias of an expandable connection with said first feed means, said expandable connection being mounted upon said first feed means and including a rotationally mounted disc, a torsion spring connected to said disc, said spring twisting in response to rotation of said disc, and a strap having one end wrapped about the circumference of said disc and fastened thereto, the other end of said strap being connected to said second feed means.

2. In a document transporting device the combination of:

driver means for moving along a certain path to a resting position;

gripper means for holding a document;

expandable coupling means connected between said driver and gripper for pulling said gripper behind said driver along said path;

a first means located in said path for stopping said gripper and permitting said driver to continue on to said resting position stretching said coupling means, and for subsequently releasing said gripper causing said coupling means to contract and pull said gripper toward said driver; and a second means located between said first means and said resting position for stopping the flight of said gripper as it approaches said driver.

3. A document reading machine wherein a document is scanned in at least two stages at a reading station, the combination of:

driver means for moving along a certain path through said reading station to a resting position;

gripper means for holding a document;

expandable coupling means connected betwen said driver and gripper for pulling said gripper behind said driver along said path;

a first means located in said path for stopping said gripper and permitting said driver to continue on to said resting position stretching said coupling means, and for subsequently releasing said gripper causing said coupling means to contract and pull said gripper toward said driver, the location of said first means being selected so that a portion of said document is stopped at said reading station; and a second means located between said first means and said resting position for stopping the flight of said gripper as it approaches said driver, the location of said second means being selected so that a different portion of said document is stopped at said reading station.

4. Apparatus as in claim 3 wherein said expandable coupling means includes, a rotationally mounted disc, a torsion spring connected to said disc, said spring twisting and adapted to twist in response to rotation of said disc, and a strap having one end wrapped about the circumference of said disc and fastened thereto, the other end of said strap being connected to said gripper.

5. In a document transporting device the combination of:

gripping means for holding a document;

a driver assembly including expandable coupling means connected to said gripping means;

motivating means connected to said driver assembly for moving said driver along a certain path to a resting position;

a reading station located in the path traveled by said driver toward said resting position;

a first means located between said reading station and resting position for stopping said gripping means and permitting said driver to continue on to said resting position stretching said coupling means, and for subsequently releasing said gripper causing said coupling means to contract and pull said gripper toward said driver, the location of said first means being selected so that a portion of the document held by said gripping means is stopped at said reading station; and a second means located between said first means and said resting position for stopping the flight of said gripping means as it approaches said driver, the location of said second means being selected so that a different portion of the document held by said gripping means is stopped at said reading station.

6. Apparatus as in claim 5 wherein said expandable coupling means includes, a shaft supported for rotational movement upon said driver assembly, a disc mounted upon said shaft, a torsion spring wound about said shaft and having one end anchored in said shaft and the other end mounted upon said driver assembly so that said spring is twisted by rotation of said disc, and a strap having one end wrapped about the circumference of said disc and fastened thereto, the other end of said strap being connected to said gripping means.

7. In a document transporting device the combination of:

gripping means for holding a document;

a driver assembly including expandable coupling means connected to said gripping means;

guiding means for directing the motion of said driver assembly along a certain path;

motivation means for moving said driver along said path to a resting position;

a stopping station located along the path of said driver assembly;

a stop located in said path between said station and resting position capable of stopping said gripper and permitting said driver to continue on to said resting position;

a second stop located between said first stop and said resting position; and control means for releasing said first stop after said driver reaches said resting position and stretches said coupling means, whereby upon release of said first stop, said second stop intercepts the flight of said gripper as it approaches said driver.

8. Apparatus as defined in claim 7 wherein said expandable coupling means includes, a shaft, a disc mounted upon said shaft, a pillow block mounted upon said driver assembly to support said shaft for rotational movement, a torsion spring wound about said shaft and having one end anchored in said shaft and the other end anchored in said pillow block so that said spring is twisted by rotation of said disc, and a strap having one end wrapped about the circumference of said disc and fastened thereto, the other end of said strap being connected to said document gripper.

9. In a document reading machine the combination of:

two side plates arranged parallel to one another with inner faces having a uniform distance therebetween;

two drive wheels each one rotationally mounted adjacent to a different one of said inner faces and having a common axis of rotation;

a motor, clutch and brake assembly connected to said drive wheels for rotating said drive wheels and for alternately holding said drive wheels in a stationary position;

two idle wheels each one rotationally mounted adjacent to a different one of said inner faces and having a common axis of rotation;

two timing belts each one encircling a different pair of said wheels including one drive wheel and one idle wheel;

a pair of matching guide tracks cut into said inner faces adjacent to the length of said belts;

a document gripper mounted in said guide tracks and having two arms extending outward overhanging said side plates, said gripper adapted to transport a document in a trailing position behind said gripper;

a cross-bar mounted transversely upon said belts;

two driver assemblies each one mounted upon said cross-bar adjacent to a different one of said side plates and each of said drivers including, a shaft, a disc mounted upon said shaft, a pillow block mounted upon said cross-bar to support said shaft for rotational movement, a torsion spring wound about said shaft and having one end anchored in said shaft and the other end anchored in said pillow block so that said spring is twisted by rotation of said disc, and a strap having one end wrapped about the circumference of said disc and fastened thereto, the other end of said strap being connected to said document gripper;

a reading station located between said side plates and adapted to present a document for reading in two stages, the first half of the document closest to said grippers, and then the second half of the document farther removed from said grippers;

a first pair of stops each one mounted upon the outer face of a different one of said side plates and arranged to engage the two arms of said gripper after having passed through said reading station so that the first half of the document is stopped in position for reading at said reading station;

a second pair of stops each one mounted upon the outer face of a different one of said side plates and arranged to engage the two arms of said gripper so that the second half of the document is in position for reading at said reading station; and control means for operating said motor, clutch and brake so that said driver is stopped after it has passed through said reading station and said first and said second stops, and for releasing said first stops after the first half of said document has been read, thereby permitting said driver assemblies to contract pulling said grippers up to said second stops.

References Cited by the Examiner

UNITED STATES PATENTS

| | | | |
|---|---|---|---|
| 2,939,701 | 6/60 | Schröter | 271—45 |
| 2,970,751 | 2/61 | Daly | 271—60 X |
| 2,996,166 | 8/61 | Bradshaw | 271—60 X |

FOREIGN PATENTS

| | | |
|---|---|---|
| 700,116 | 11/53 | Great Britain. |

SAMUEL F. COLEMAN, *Primary Examiner.*

ROBERT B. REEVES, *Examiner.*